J. M. KROYER.
LUBRICATING MEANS FOR ROLLER PINIONS.
APPLICATION FILED MAR. 1, 1916.
1,200,203.
Patented Oct. 3, 1916.
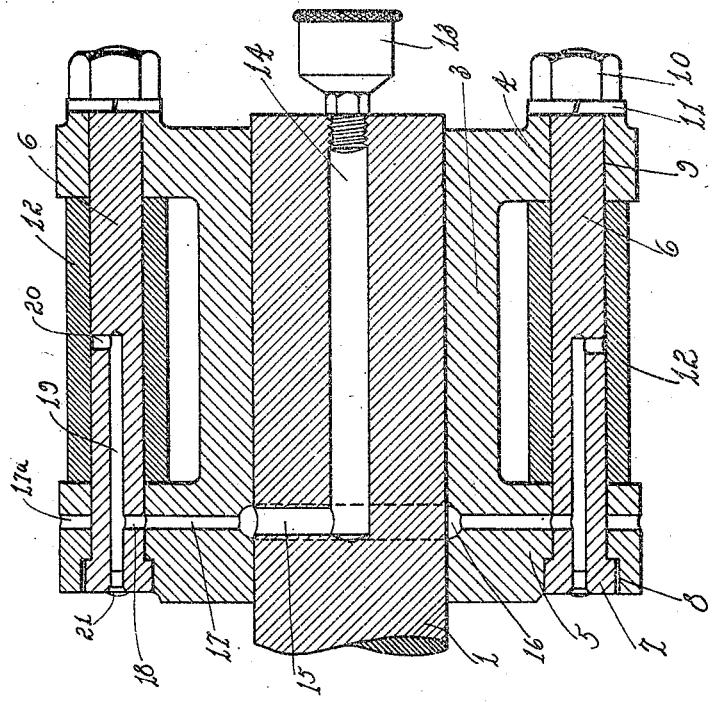
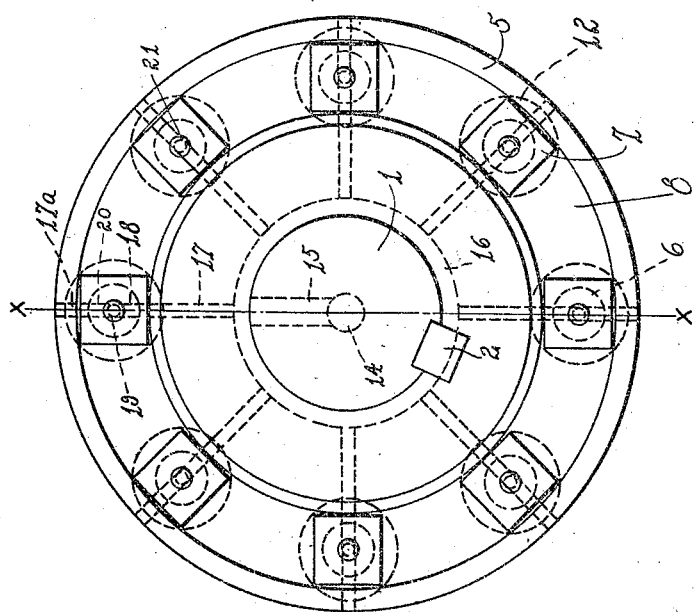
WITNESS.
Floyd M. Blanchard
INVENTOR.
John M. Kroyer
BY
ATTORNEY.

UNITED STATES PATENT OFFICE.

JOHN M. KROYER, OF STOCKTON, CALIFORNIA.

LUBRICATING MEANS FOR ROLLER-PINIONS.

1,200,203.  Specification of Letters Patent.  Patented Oct. 3, 1916.

Application filed March 1, 1916. Serial No. 81,372.

*To all whom it may concern:*

Be it known that I, JOHN M. KROYER, a citizen of the United States, residing at Stockton, in the county of San Joaquin, State of California, have invented certain new and useful Improvements in Lubricating Means for Roller-Pinions; and I do declare the following to be a full, clear, and exact description of the same, reference being had to the accompanying drawings, and to the characters of reference marked thereon, which form a part of this application.

This invention relates to an improved means of lubrication for the teeth of roller pinions, namely, that class of pinions, the teeth of which are constructed by using a turnable roller mounted upon a stationary pin. By the use of my improved lubricating means all the teeth of the pinion may be lubricated simultaneously from one grease cup thus eliminating the wasting of the grease as well as saving the time of the operator and also at the same time applying the grease where it will do the most good. The bearing surface between the roller and the pinion will also be kept clean and free from dirt since in my improved means the grease is applied to the center of the bearing and will at all times be forced to work toward the end of the roller thereby keeping a new clean supply near the center.

A further object of the invention is to produce a simple and inexpensive device and yet one which will be exceedingly effective for the purposes for which it is designed.

These objects I accomplish by means of such structure and relative arrangement of the parts as will fully appear by a perusal of the following specification and claim.

In the drawings similar characters of reference indicate corresponding parts in the views.

Figure 1 is an end view of the pinion. Fig. 2 is a cross section taken on a line X—X of Fig. 1.

Referring now more particularly to the characters of reference on the drawings the numeral 1 indicates a shaft and rigidly mounted thereon by means of a key 2 I have provided a hub member 3 having outwardly projecting flanges as at 4 and 5.

Equally spaced upon the pitch circumference of the pinion I provide pins 6 having square heads 7 fitting tightly into a slot 8 cut into the flange 5. By means of this arrangement the pins will at all times be held stationary. The other ends of the pins 6 will pass through holes 9 in the flange 4 and have nuts 10 screwed thereon which will bear against spring washers 11. Mounted upon these pins 6 will be the turnable rollers 12.

The lubricating means consists of a grease cup 13 screwed into the end of the shaft 1. Leading from this grease cup 13 through the shaft 1 is a passageway 14 extending approximately the length of the pinion hub and then leading from this passageway at right angles thereto is another passageway 15 communicating with a half round groove 16 cut into the inner surface of the pinion hub and continuing the full circumference thereof. Projecting radially through the center point of each pin 6 I have then drilled a hole 17 down to the groove 16. Each pin 6 I have provided with an opening, as at 18, which will, upon inserting the pin between the flanges 4 and 5, come into communication with the opening 17. Through the center of the pin 6 I have drilled a hole 19 communicating with the opening 18 and leading to a passageway 20 at the center of the roller 12.

The passageway 19 will be closed by means of a plug 21 to prevent the escape of any grease therefrom. The continued passageway, as at 17$^a$, will not have to be plugged as the stationary pin 6 will effectually close the same. When desiring to lubricate the rollers it will only be necessary to operate the grease cup 13 which will force the grease through the passageways to the center bearing points of the rollers.

From the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention as defined by the appended claim.

Having thus described my invention what I claim as new and useful and desire to secure by Letters Patent is:

The combination of a shaft provided with a central bore and a passage connecting the bore with the surface of the shaft, a roller pinion comprising a body portion on the shaft having an annular channel communicating with the shaft passage and passages, pins carried by the body portion having bearing portions and passages therein terminating at the bearing portions thereof and adapted to communicate with the passages in the body portion, and rollers on the bearing portions of the pins.

In testimony whereof I affix my signature.

JOHN M. KROYER.